United States Patent Office 3,424,818
Patented Jan. 28, 1969

3,424,818
CURED PVC-RUBBER AND RESIN BLENDS
Roger S. Hawley, Cranford, and Byron M. Vanderbilt, Westfield, N.J., assignors to Esso Research and Engineering Company, a corporation of Delaware
No Drawing. Filed Oct. 21, 1965, Ser. No. 500,177
U.S. Cl. 260—836     23 Claims
Int. Cl. C08f 29/22, 29/24

ABSTRACT OF THE DISCLOSURE

A process for co-curing a blend of polyvinyl chloride and a non-volatile plasticizer by contacting said blend with a minor amount of zinc oxide and a mononuclear aromatic quinoid compound.

---

This invention relates to the cross-linking of thermoplastic polymer blends. More particularly, the present invention relates to the cross-linking of chain saturated thermoplastic polymers blended with various types of polymer, rubber and resin plasticizing agents.

Chain polymers, particularly polyvinyl chloride, are tough relatively stiff materials that are not easily processed. Such polymers often exhibit very poor impact properties. To improve the processing characteristics and impact properties of chain polymers such as polyvinyl chloride, the polymers are often blended with plasticizing agents. Although the plasticizing agents improve the impact properties and processing characteristics of chain polymers, such blending is often at the sacrifice of the desirable properties of the polymer in that the total blend has a reduced tensile strength, less resistance to solvents, and relatively poor high temperature properties.

Now, in accordance with the present invention, it has been discovered that chain polymers such as polyvinyl chloride can be blended with various types of polymeric substances and resins to improve the processing and impact properties of the chain polymer without sacrificing desirable polymer properties by cross-linking the plasticized polymer with the curing system of this invention. The cross-linking operation is conducted by mixing the chain polymer and the plasticizing agent with minor amounts of zinc oxide and a mono-nuclear aromatic quinone compound as essential ingredients and other ingredients such as stabilizers and fillers to form a total blend, shaping the total blend, and heating at an elevated temperature for a time sufficient for cross-linking to take place.

A wide variety of high molecular weight, substantially saturated chain polymers prepared by polymerization of monomers preferably containing at least about 0.5 wt. percent of vinyl halide or vinylidene halide repeat units preferably vinyl and vinylidene chloride repeat units may be blended with suitable polymers and resins and cured according to the process of this invention. In general, the polymers that are cured with the curing system of this invention have molecular weights of at least 5000, and for the most part are solid materials. Representative non-limiting examples of polymers which may be blended and subsequently cured with the cross-linking system of the present invention include polyvinyl chloride, polyvinylidene chloride, vinyl chloride-vinylidene chloride copolymers, vinyl chloride-vinyl acetate copolymers, vinyl chloride-styrene copolymers, vinylidene chloride-vinyl acetate copolymers, vinylidene chloride-styrene copolymers, etc.

The impact and processing characteristics of the above named polymers are materially improved by incorporating therein from 1 to 400 preferably 20 to 200 parts by weight of plasticizing compound per 100 parts by weight of chain polymer. Useful plasticizing compounds that serve both to improve the processing and impact characteristics of the polymer and which can be subsequently cross-linked with the curing system of this invention include nitrogen containing polymers, halogenated polymers and rubbers especially chlorinated polymers and rubbers, and epoxidized polymers and resins. Examples of useful plasticizing compounds include acrylonitrile-butadiene rubber, chlorinated and brominated copolymers of isobutylene and isoprene, homopolymers of 2-chlorobutadiene, chloro sulfonated polyethylene, chlorinated natural rubber, chlorinated polyethylene, chlorinated polyisobutylene, epoxidized polybutadiene, epoxidized soy bean oil, the di- and tri-epoxides of the condensation product of ethylchlorohydrin with glycerine, polyepicholorohydrin, and a 1–1 molecopolymer of epichlorohydrin and ethylene oxide.

The curing system of the present invention consists of zinc oxide and a mono-nuclear aromatic quinone compound. Useful mono-nuclear aromatic quinone compounds, that is compounds having a single cyclic radical per molecule, include benzoquinone, hydroquinone, and their halogenated, preferably chlorinated, derivatives. Particularly useful halogenated compounds include tetrachlorobenzoquinone, tetrachlorohydroquinone, trichlorohydroquinone, tetrabromobenzoquinone, etc. Zinc oxide is the only applicable metallic oxide useful in the curing system. Magnesium oxide, a compound which is commonly associated with zinc oxide in many curing systems, tends to treminate curing reaction with or without the presence of zinc oxide.

The quantity of quinone compound and zinc oxide used will depend upon the degree of cure desired and the reactivity of the polymer and plasticizing compound being cross-linked. In general, from 0.05 to 20 wt. percent preferably 1 to 6 wt. percent zinc oxide based on chain polymer and plasticizing compound is required. Greater quantities may be used but the economics of such addition is unfavorable. The quantity of mon-nuclear aromatic quinone compound used ranges from about 1 to 6 preferably 2 to 5 wt. percent based on the polymer and plasticizing compound.

The curing operation for simultaneously cross-linking the chain polymers containing vinyl halide or vinylidene halide repeat units and the plasticizing compound is conducted by mixing the components of the curing system with the polymer and plasticizing compound along with any desired stabilizers or fillers and passing the total mixture to a mold where the mixture is maintained at an elevated temperature and pressure for a time sufficient to obtain a product having a relatively high cross-link density. Utilizing the curing system of the present invention, cure temperatures ranging from 250 to 450° F., preferably 290 to 390° F. can be used. The pressure at which the curing operation is conducted can vary over a wide range. Generally, compounds having relatively high cross-link densities are obtained if the blend is cured at mold pressures varying from about 100 to 3000 p.s.i.; however, mold pressures varying from 500 to 2000 p.s.i. are preferred. Cure times under the above conditions of temperature and pressure may vary from about 1 to 120 minutes; however, cure times varying from about 10 to 60 minutes will be more common in commercial operations.

tion. The samples were then cured into pads at approximately 1200 p.s.i. with the use of a cavity mold. Standard dumbbells were then cut from each of the pads and tested for tensile strength at 250° F. and solvent resistance by immersion in methyl ethyl ketone. The results of the test are set forth in Table I below.

TABLE I

| | Run | | | | | | | |
|---|---|---|---|---|---|---|---|---|
| | 1 | 2 | 3 | 4 | 5 | 6 | 7 | 8 |
| Polyvinyl chloride | 100 | 90 | 90 | 90 | 90 | 100 | 100 | 100 |
| Butadiene-acrylonitrile rubber | | 10 | 10 | 10 | 10 | 5 | 5 | 5 |
| Cadmium-barium stabilizer | 2 | 2 | 2 | 2 | 2 | | | 2 |
| Zinc oxide | | | | 5 | | 5 | 5 | 5 |
| Tetrachlorobenzoquinone | | | | | 3 | 3 | 3 | |
| Tetrachlorohydroquinone | | | | | | | | 3 |
| Tensile strength (p.s.i.)—250° F. cure 307° F./45 min | | 350 | 150 | 135 | 565 | 925 | | | |
| Wt. percent increase; immersion in methyl ethyl ketone—48 hrs. cure 307° F./45 min | | Disintegrated | | 138 | 115 | | | |
| Tensile strength (p.s.i.)—250° F. cure 320° F./45 min | | 350 | 150 | 150 | 560 | 1,010 | | | |
| Wt. percent increase; immersion in methyl ethyl ketone—48 hrs. cure 320° F./45 min | | Disintegrated | | 127 | 100 | | | |
| Tensile strength (p.s.i.)—250° F. cure 300° F./60 min | | | | | | | 850 | 600 | 790 |
| Wt. percent increase; immersion in methyl ethyl ketone—24 hrs. cure 320° F./60 min | | | | | | | 100 | | 102 |

In addition to the plasticizing compound set forth above, various types of carbon black, coke or mineral fillers may be incorporated into the blend up to about 200 parts, preferably up to 100 parts, of filler per 100 parts of polymer and plasticizing compound. Among the carbon blacks that may be compounded with the chain polymer and plasticizing compound are the channel blacks such as EPC, MPC, HPC, etc. (these letters denoting carbon black products well known to the trade), the furnace blacks including SRF, HAF, etc. and the thermal blacks. The mineral fillers which may be used include any of the usual non-carbon black fillers or pigments such as the oxides, hydroxides, carbonates and so forth of silicon, aluminum, titanium or the like, or the silicates or aluminates of the various elements above indicated.

Stabilizers for the chain polymer must be carefully chosen lest they interfere with the curing reaction. For example, stabilizers of the tin-type have a very deleterious affect on the effectiveness of the curative combination. The lead phosphite stabilizer types have a less harmful affect, whereas the cadmium-barium types have little or no retarding affect on the curing system.

The following examples will better illustrate the nature of the present invention; however, the invention is not intended to be limited to these examples. Parts are by weight unless otherwise indicated.

EXAMPLE 1

To demonstrate the effectiveness of the curing system of the present invention and also the properties of the cure products, a rubbery copolymer of approximately 64 wt. percent butadiene and 36 wt. percent acrylonitrile was broken down by masticating on a cold, tight fitting roller mill until the rubber had a Mooney viscosity of about 39. To the masticated rubber was then added an amount of polyvinyl chloride along with any necessary stabilizers. The resulting mixture was easily compounded. After the mixing operation the blend was heated to 300° F. Portions of this blend were then cooled to 250° F. and mixed with the components of the curing system of the present invention.

The above tests indicate that the cured sample of Run 5 has markedly superior tensile properties and solvent resistance properties than the samples of Runs 1–4. Although the use of tetrachlorobenzoquinone alone (Run 4) resulted in some cure, it is much inferior to the sample of Run 5 where a combination of the quinone and zinc oxide was used. Even though the composition of Run 5 was highly cross-linked as indicated by the high tensile strengths of 250° F., there was a considerable adsorption of methyl ethyl ketone as ketones are excellent solvents for both the polyvinyl chloride and the butadiene-acrylonitrile rubber. However, the sample of Run 5 cured at 320° F. for 45 minutes retained its shape well in the methyl ethyl ketone and had considerable strength and snap after the immersion test. It may be noted that the rigid polyvinyl chloride compound of Run 1 was actually stronger at 250° F. than the compounds containing the butadiene-acrylonitrile rubber or butadiene-acrylonitrile rubber plus zinc oxide. This demonstrates the plasticizing affect of the butadiene-acrylonitrile rubber.

Runs 6, 7 and 8 illustrate that zinc oxide in combination with either tetrachlorobenzoquinone or tetrachlorohydroquinone serve to secure cross-linked products having desirable tensile and solvent resistance properties even when the compounds were cured at relatively low temperatures.

EXAMPLE 2

Twelve samples of polyvinyl chloride having an inherent viscosity of 1.05 (ASTM–D–1243–60) were compounded with the butadiene-acrylonitrile rubber of Example 1 to obtain an easy processing stock. To this stock was then added various types and quantities of carbon black, stabilizers, anti-oxidants, and the components of the curing system of this invention. The resulting mixtures were then cured into pads in a conventional cavity mold at 300° F. for 1 hour. Standard dumbbells were cut from the pads and tested for tensile strength at room temperature and 250° F. and solvent resistance in methyl ethyl ketone and toluene. The results of the tests are set forth in Table II below.

TABLE II

| Run | Polyvinyl chloride | Butadiene acrylonitrile rubber | ZnO | Tetrachlorobenzoquinone | Carbon black | Cadmium-barium stabilizer | Antioxidant [1] | Tensile strength (p.s.i.) Room temp. | Tensile strength (p.s.i.) 250° F. | Percent increase in weight, 24 hrs. Methyl ethyl ketone | Percent increase in weight, 24 hrs. Toluene |
|---|---|---|---|---|---|---|---|---|---|---|---|
| 9 | 67 | 33 | 10 | 10 | | | | 5,285 | 505 | 130 | 58 |
| 10 | 67 | 33 | 10 | 10 | [2] 40 | | | 5,850 | 1,180 | 58 | 35 |
| 11 | 67 | 33 | 10 | 10 | [2] 40 | 2 | | 6,550 | 1,385 | 58 | 37 |
| 12 | 67 | 33 | 10 | 10 | [2] 40 | 2 | 1 | 7,070 | 1,565 | 61 | 37 |
| 13 | 83 | 17 | 10 | 10 | [2] 40 | 2 | 1 | 9,410 | 1,690 | 57 | 15 |
| 14 | 83 | 17 | | | [2] 40 | 2 | 1 | 7,050 | 595 | ([8]) | |
| 15 | 83 | 17 | 10 | 10 | [3] 15 | 2 | 1 | 8,120 | 1,105 | 79 | 17 |
| 16 | 83 | 17 | 10 | 10 | [4] 30 | 2 | 1 | 9,745 | 1,800 | 58 | 5 |
| 17 | 83 | 17 | 10 | 10 | [4] 40 | 2 | 1 | 8,900 | 2,095 | 52 | |
| 18 | 83 | 17 | 10 | 10 | [5] 50 | 2 | 1 | 6,250 | 1,165 | 63 | 13 |
| 19 | 83 | 17 | 10 | 10 | [6] 60 | 2 | 1 | 8,620 | 2,215 | 50 | |
| 20 | 83 | 17 | 10 | 10 | [7] 30 | 2 | 1 | 8,615 | 2,205 | 61 | |

[1] 4,4'-methylenebis(2,6-di-tert-butylphenol).
[2] A gas base semi-reinforcing furnace black (Pelletex).
[3] Easy processing channel black (Spheron-9).
[4] Oil furnace black (Vulcan-9).
[5] Fine thermal black (P-33).
[6] Medium thermal black (Thermax).
[7] Oil base furnace black (Philblack A).
[8] Disintegrated.

Run 9 of the above table demonstrates that even with a stock made up of two parts of polyvinyl chloride per single part of butadiene-acrylonitrile rubber, the strength of the cured product at 250° F. is higher than that of the unplasticized polyvinyl chloride (see Example 1). However, when black is added (Runs 10-13) the strength at 250° F. is more than doubled and the swelling in methyl ethyl ketone is decreased to less than one half of that for the cured gum stock (Run 9). The presence of the cadmium-barium stabilizer for the polyvinyl chloride and the bisphenol antioxidant for the butadiene-acrylonitrile rubber (Runs 12 and 13) gives further improved strengths at 250° F.

Use of a lower plasticized stock, as exemplified by Run 13, results in a higher strength and less swelling in an aromatic diluent. Run 14, a control containing carbon black but no curatives, gave a stock having only 75% of the tensile strength of cured product at room temperature and about 35% of the strength of the cured blend when measured at 250° F. Tensile measurements carried out at 160° F. and 200° F. showed that the strength of the cured sample of Run 13 was actually stronger at 200° F. than the rigid polyvinyl chloride of Example 1 or Run 14 when measured at 160° F.

Runs 15–20 illustrate the use of various types of carbon black as fillers in the cured compositions of the present invention. The above test runs demonstrate that a butadiene-acrylonitrile rubber can be compounded with polyvinyl chloride to obtain polymer processability and that by subsequent cross-linking with the zinc oxide quinone curing system the plasticized polyvinyl chloride can then be converted to an attractive product with properties superior to the original rigid polyvinyl chloride. Furthermore, the cross-linking operation permits the use of high filler loading that serves to enhance the properties of the polyvinyl chloride.

EXAMPLE 3

To further demonstrate the utility of the curing system of the present invention, polyvinyl chloride was first compounded with three types of halogenated polymers and then cross-linked or covulcanized with a curing system made up of zinc oxide and tetrachlorobenzoquinone. The compositions were formed by mixing the polyvinyl chloride and the halogenated polymer at about 250° F. on a two roll mill. To this mixture was added the curing agents. The final composition was cured in a cavity mold at time and temperature conditions expressed in the tables below. The polyvinyl chloride used in each of the blending operations had an inherent viscosity of 1.05 (ASTM–D–1243–60). The halogenated polymers used as plasticizing agents were: (1) a chlorinated copolymer of a major amount of isobutylene and a minor amount of isoprene having a viscosity average molecular weight varying from 350,000 to 400,000; a Mooney viscosity, ML/8 min. at 212° F. varying from 50 to 60; a mole percent unsaturation of 1–2; and a chlorine content of about 1.1 to 1.3 wt. percent; (2) a homopolymer of 2-chlorobutadiene having a specific gravity of about 1.23; and (3) chlorosulfonated polyethylene having a specific gravity of 1.18. The results of the vulcanization test are set forth in Tables III, IV, and V below.

TABLE III

| | Run | | | |
|---|---|---|---|---|
| | 21 | 22 | 23 | 24 |
| Polyvinyl chloride | 90.0 | | | |
| Cadmium-barium stabilizer | 2.0 | | | |
| Chlorinated copolymer of isobutylene-isoprene | 10.0 | | | |
| ZnO | 5.0 | | | 5.0 |
| Tetrachlorobenzoquinone | | | 3.0 | 3.0 |
| Press Cured 45 Min. at 370° F.: | | | | |
| Tensile at 250° F., p.s.i | 120 | 170 | 40 | 260 |
| Volume swell in MEK 48 hrs., weight percent | ([1]) | 155 | 196 | 112 |
| Press Cured 30 Min. at 320° F.: | | | | |
| Tensile at 250° F., p.s.i | 90 | 135 | 25 | 235 |
| Volume swell in MEK 48 hrs., weight percent | ([1]) | 135 | 169 | 98 |
| Press Cured 45 Min. at 320° F.: | | | | |
| Tensile at 250° F., p.s.i | 95 | 255 | 70 | 195 |
| Volume swell in MEK 48 hrs., weight percent | ([1]) | 116 | 138 | 66 |

[1] Disintegrated.

TABLE IV

| | Run | | | |
|---|---|---|---|---|
| | 25 | 26 | 27 | 28 |
| Polyvinyl chloride | 90.0 | | | |
| Barium-cadium stabilizer | 2.0 | | | |
| Poly 2-chlorobutadiene | 10.0 | | | |
| ZnO | 5.0 | | | 5.0 |
| Tetrachlorobenzoquinone | | | 3.0 | 3.0 |
| Press Cured 45 Min. at 307° F.: | | | | |
| Tensile at 250° F., p.s.i | 200 | 200 | 330 | 655 |
| Volume swell in MEK 72 hrs., weight percent | 172 | 275 | 171 | 124 |
| Press Cured 30 Min. at 320° F.: | | | | |
| Tensile at 250° F., p.s.i | 210 | 215 | 320 | 540 |
| Volume swell in MEK 72 hrs., weight percent | 235 | 222 | 162 | 108 |
| Press Cured 45 Min. at 320° F.: | | | | |
| Tensile at 250° F., p.s.i | 290 | 365 | 380 | 535 |
| Volume swell in MEK 72 hrs., weight percent | 215 | 129 | 145 | 66 |

TABLE V

| | Run | | | |
|---|---|---|---|---|
| | 29 | 30 | 31 | 32 |
| Polyvinyl chloride | 90.0 | | | |
| Barium-cadmium stabilizer | 2.0 | | | |
| Chlorosulfonated polyethylene | 10.0 | | | |
| ZnO | 5.0 | | 5.0 | |
| Tetrachlorobenzoquinone | | | 3.0 | 3.9 |
| Press Cured 45 Min. at 307° F.: | | | | |
| Tensile at 250° F., p.s.i | 220 | 520 | 135 | 915 |
| Volume swell in MEK 24 hrs., weight percent | 257 | 173 | 208 | 39 |
| Press Cured 30 Min. at 320° F.: | | | | |
| Tensile at 250° F., p.s.i | 190 | 935 | 215 | 405 |
| Volume swell in MEK 24 hrs., weight percent | 224 | 95 | 172 | 31 |
| Press Cured 45 Min. at 320° F.: | | | | |
| Tensile at 250° F., p.s.i | 180 | 595 | 180 | 475 |
| Volume swell in MEK 24 hrs., weight percent | 181 | 29 | 165 | 26 |

As can be seen by referring to Tables III, IV and V, the vulcanizates obtained with the use of zinc oxide and tetrachlorobenzoquinone exhibited properties superior to each of the three control formulations in each table. The vulcanizates of Runs 24, 28, and 32 illustrate that higher tensile strengths at 250° F. and lower volume swells in methyl ethyl ketone were secured with the vulcanizates promoted with the combination of zinc oxide plus tetrachlorobenzoquinone. With each of the three halogenated polymers, the cure at 320° F. for 45 minutes gave the highest cross-link density. This result is shown by the relatively low volume swell in methyl ethyl ketone.

EXAMPLE 4

Following the procedure of Example 3, polyvinyl chloride having an inherent viscosity of 1.05 (ASTM–D–1243–60) was compounded with various types of materials having epoxide functionality and subsequently cross-linked with the curative system of the present invention. The polyvinyl chloride and the polymer resin having the epoxide functionality were compounded on a two roll mill at about 250° F. and then mixed with the curing system. The resulting compositions were then cross-linked for varying periods of time and temperature in a cavity mold to obtain cured pads. From these pads were cut standard dumbbells that were tested for tensile and solvent resistance properties.

The polymers and resins used in the curing studies were: (1) epoxidized polybutadiene having a viscosity of 1800 poises at 25° C., a specific gravity of 1.01, epoxy percent—9%, an epoxy equivalent of 177, and an iodine number of 185; (2) an epoxidized soybean oil having a specific gravity of 0.994, a viscosity of 400 poises at room temperature, a molecular weight of about 1000, and a flash point of about 585° F.; and (3) a mixture of branched di- and tri-epoxides formed by the condensation of epichlorohydrin and glycerine and having an epoxide functionality of 2.2, a chlorine content of 10 wt. percent, an average molecular weight of 306, a viscosity varying from 0.9 to 1.5 poises at 25° C. and an epoxide equivalent varying from 140 to 160. The results of the curing tests are set forth in Tables VI, VII and VIII below.

TABLE VI

| | Run | | | |
|---|---|---|---|---|
| | 33 | 34 | 35 | 36 |
| Polyvinyl chloride | 90.0 | | | |
| Barium-cadmium stabilizer | 2.0 | | | |
| Epoxidized polybutadiene | 10.0 | | | |
| ZnO | 5.0 | | 5.0 | |
| Tetracholorobenzoquinone | | | 3.0 | 3.0 |
| Press Cured 45 Min. at 307° F.: | | | | |
| Tensile at 250° F., p.s.i | (1) | (1) | 250 | 450 |
| Volume swell in MEK 48 hrs., weight percent | (1) | (1) | 159 | 118 |
| Press Cured 30 Min. at 320° F.: | | | | |
| Tensile at 250° F., p.s.i | (1) | (1) | 345 | 270 | 695 |
| Volume swell in MEK 48 hrs., weight percent | (2) | (2) | (2) | 108 |
| Press Cured 45 Min. at 320° F.: | | | | |
| Tensile at 250° F., p.s.i | (1) | (1) | 375 | 855 |
| Volume swell in MEK 48 hrs., weight percent | (2) | (2) | (2) | 102 |

¹ Too brittle.
² Disintegrated.

TABLE VII

| | Run | | | |
|---|---|---|---|---|
| | 37 | 38 | 39 | 40 |
| Polyvinyl chloride | 100.00 | | | |
| Barium-cadmium stabilizer | 2.0 | | | |
| Epoxidized soybean oil | 5.0 | | | |
| ZnO | 5.0 | | 5.0 | |
| Tetrachlorobenzoquinone | | | 3.0 | 3.0 |
| Press Cured 45 Min. at 320° F.: | | | | |
| Tensile at 250° F., p.s.i | 310 | 365 | 310 | 785 |
| Volume swell in MEK 47 hrs., weight percent | (1) | (1) | (1) | 130 |

¹ Disintegrated.

TABLE VIII

| | Run | | | |
|---|---|---|---|---|
| | 41 | 42 | 43 | 44 |
| Polyvinyl chloride | 100.00 | | | |
| Barium-cadmium stabilizer | 2.0 | | | |
| Epichlorohydrin-glycerine condensate | 5.0 | | | |
| ZnO | 5.0 | | 5.0 | |
| Tetrachlorobenzoquinone | | | 3.0 | 3.0 |
| Press Cured 45 Min. at 320° F.: | | | | |
| Tensile at 250° F., p.s.i | 225 | 395 | 460 | 470 |
| Volume swell in MEK 47 hrs., weight percent | (1) | (1) | (1) | (1) |

¹ Disintegrated.

Runs 36, 40 and 44 of Tables VI, VII, and VIII respectively demonstrate the effectiveness of the curing system of the present invention. Specifically, higher tensile strengths at 250° F. and lower volume swells in methyl ethyl ketone were obtained with the vulcanizates promoted with the combination of zinc oxide and tetrachlorobenzoquinone.

Epoxy resins and epoxidized polymers have been previously used as stabilizers and processing aids for polyvinyl chloride. As a stabilizer, the epoxy resins and polymers are particularly effective in combination with a cadmium-barium stabilizer. However, as usually employed, the epoxy resin polymer actually lowers the strength of the polyvinyl chloride, but with the present process where the epoxy-containing compound is co-cured with the polyvinyl chloride after the plasticized polyvinyl chloride is formed into the proper shape, use of the epoxy actually results in higher strengths.

The curing system of the present invention serves to co-cure chain polymers such as polyvinyl chloride with polymers and resins having olefinic, halogen or epoxy functionality. The cured products so formed have many varied uses. For examples, the co-cured plasticized polymers may be used as wire and cable coatings, flooring, and in the manufacture of a wide variety of molded articles such as process piping.

While there are above-described a number of specific embodiments of the present invention, it is obviously possible to produce other embodiments of various equivalent modifications and variations thereof without departing from the spirit and scope of the invention. Having now set forth the general nature and specific embodiments of the present invention, the true scope is now particularly pointed out in the appended claims.

What is claimed is:

1. A process for co-curing a polymer containing at least 0.5 wt. percent of vinyl halide or vinylidene halide repeat units having a molecular weight of at least 5,000 selected from the group consisting of polyvinyl chloride, polyvinylidene chloride, vinyl chloride-vinylidene chloride copolymers, vinyl chloride-vinyl acetate copolymers, vinyl chloride-styrene copolymers, vinylidene chloride-vinyl acetate copolymers, vinylidene chloride-styrene copolymers, and mixtures thereof with a plasticizing agent which comprises:
   (a) blending said polymer with about 1 to about 400 parts per hundred base on said polymer of a plasticizing agent selected from the group consisting of butadiene acrylonitrile copolymers, halogenated copolymers of isobutylene and isoprene, homopolymers of 2-chlorobutadiene, chlorosulfonated polyethylene, chlorinated natural rubber, chlorinated polyethylene, chlorinated polyisobutylene, epoxidized polybutadiene, epoxidized soya bean oil, di- and tri-epoxides of the condensation product of ethylchlorohydrin with glycerine, polyepichlorohydrin, a 1:1 mole ratio of copolymers of epichlorohydrin with ethylene oxide and mixtures thereof;

(b) contacting said blend with minor amounts of zinc oxide and a mononuclear aromatic quinone compound selected from the group consisting of hydroquinone, benzoquinone and their ring halogenated derivatives; and (c) heating said mixture for a time sufficient to obtain a cured product.

2. The method of claim 1 wherein said plasticizing agent is a copolymer of butadiene and acrylonitile.

3. The method of claim 1 wherein said plasticizing agent is a chlorinated polymer of isobutylene and isoprene.

4. The method of claim 1 wherein said plasticizing agent is poly 2-chlorobutadiene.

5. The method of claim 1 wherein said plasticizing agent is chlorosulfonated polyethylene.

6. The method of claim 1 wherein said plasticizing agent is epoxidized polybutadiene.

7. The method of claim 1 wherein said quinone compound is tetrachlorobenzoquinone.

8. The method of claim 1 wherein said quinone compound is tetrachlorohydroquinone.

9. A process for co-curing a blend of polyvinyl chloride with a plasticizing agent comprising butadiene acrylonitrile copolymers which comprises contacting said blend with a curing system comprising a minor amount of zinc oxide and a mononuclear aromatic quinone compound selected from the group consisting of benzoquinone, hydroquinone and their ring halogenated derivatives for a time sufficient to obtain a cured product.

10. The method of claim 9 wherein said halogenated derivatives are chlorinated derivatives.

11. The method of claim 10 wherein from 0.05 to 20 wt. percent zinc oxide based on polyvinyl chloride-plasticizing agent mixture and from 1.0 to 6.0 wt. percent of quinone compound based on polyvinyl chloride-plasticizing agent mixture is contacted with said polyvinyl chloride-plasticizing agent mixture.

12. The method of claim 11 wherein said mixture is heated in contact with said curing system at a temperature of from 250 to 450° F. for from 1 to 120 minutes.

13. The method of claim 12 wherein said mixture contains from 1 to 400 parts of plasticizing compound per 100 parts of polyvinyl chloride.

14. The method of claim 13 wherein said quinone compound is tetrachlorobenzoquinone.

15. The method of claim 13 wherein said quinone compound is tetrachlorohydroquinone.

16. The method of claim 13 wherein said plasticizing agent is a chlorinated copolymer of isobutylene and isoprene.

17. The method of claim 13 wherein said plasticizing agent is poly 2-chlorobutadiene.

18. The process of claim 9 wherein said quinone compound is tetrachlorobenzoquinone.

19. The process of claim 9 wherein said quinone compound is tetrachlorohydroquinone.

20. A curable composition which comprises:
(a) a blend of a polymer containing at least 0.5 wt percent of vinyl halide or vinylidene halide repeat units having a molecular weight of at least 5,000 selected from the group consisting of polyvinyl chloride, polyvinylidene chloride, vinyl chloride-vinylidene chloride copolymers, vinyl chloride-vinyl acetate copolymers, vinyl chloride-styrene copolymers, vinylidene chloride-vinyl acetate copolymers, vinylidene chloride-styrene copolymers, and mixtures thereof with about 1 to about 400 parts per hundred based on said polymer of a plasticizing compound selected from the group consisting of butadiene acrylonitrile copolymers, halogenated copolymers of isobutylene and isoprene, homopolymers of 2-chlorobutadiene, chlorosulfonated polyethylene, chlorinated natural rubber, chlorinated polyethylene, chlorinated polyisobutylene, epoxidized polybutadiene, epoxidized soya bean oil, di- and tri-epoxides of the condensation product of ethylchlorohydrin with glycerine, polyepichlorohydrin, a 1:1 mole ratio of copolymers of epichlorohydrin with ethylene oxide and mixtures thereof; and (b) a vulcanizing amount of a curative comprising zinc oxide and a mononuclear aromatic quinone compound selected from the group consisting of hydroquinone, benzoquinone and their ring halogenated derivatives.

21. A curable composition which comprises a blend of polyvinyl chloride with about 1 to about 400 parts per hundred based on the polyvinyl chloride of a plasticizing agent comprising butadiene acrylonitrile copolymers and a vulcanizing amount of a curative comprising zinc oxide and a mononuclear aromatic quinone compound selected from the group consisting of benzoquinone, hydroquinone and their ring halogenated derivatives.

22. The vulcanizate of claim 20.

23. The vulcanizate of claim 21.

References Cited
UNITED STATES PATENTS

| | | | |
|---|---|---|---|
| 2,524,977 | 10/1950 | Holbrook et al. | 260—83.3 |
| 3,151,186 | 9/1964 | Lucke | 260—891 |
| 3,291,857 | 12/1966 | Howerton | 260—836 |

SAMUEL H. BLECH, *Primary Examiner.*

M. J. TULLY, *Assistant Examiner.*

U.S. Cl. X.R.

260—3.5, 30.4, 33.8, 33.4, 890, 891, 896, 897, 899, 23